United States Patent [19]
Yoshinaka

[11] Patent Number: 6,110,037
[45] Date of Patent: Aug. 29, 2000

[54] AIR CONDITIONING DUCT DEVICE IN AUTOMOBILE

[75] Inventor: Katsunori Yoshinaka, Saitama, Japan

[73] Assignee: Moriroku Kabushiki Kaisha, Tokyo, Japan

[21] Appl. No.: 09/199,798

[22] Filed: Nov. 25, 1998

[30] Foreign Application Priority Data

Dec. 1, 1997 [JP] Japan .................................. 9-330010

[51] Int. Cl.⁷ ...................................................... B60H 1/26
[52] U.S. Cl. ...................... 454/143; 296/70; 296/190.09; 296/208; 454/127
[58] Field of Search .................................. 454/127, 152, 454/143; 296/70, 190.09, 208

[56] References Cited

U.S. PATENT DOCUMENTS

| | | | |
|---|---|---|---|
| 4,223,754 | 9/1980 | Mizuno et al. ..................... | 454/127 X |
| 4,559,868 | 12/1985 | Nonaka et al. ......................... | 454/127 |
| 5,238,387 | 8/1993 | Hama et al. . | |
| 5,354,114 | 10/1994 | Kelman et al. ..................... | 454/127 X |
| 5,709,601 | 1/1998 | Heck .................................. | 454/127 X |
| 5,762,395 | 6/1998 | Merrifield .......................... | 454/127 X |
| 5,951,087 | 9/1999 | Bittinger et al. . | |

FOREIGN PATENT DOCUMENTS 8-58431   3/1996   Japan .

Primary Examiner—Harold Joyce
Attorney, Agent, or Firm—Arent Fox Kintner Plotkin & Kahn PLLC

[57]   ABSTRACT

A panel body of an instrument panel in an automobile is formed of a synthetic resin foam. A duct element made of a synthetic resin foam having a compatibility with the panel body is welded to a back of the panel body to define air-conditioning air passages between the panel body and the duct element. Thus, the instrument panel also serves as a single duct element. Therefore, it is possible to provide an inexpensive air conditioning duct device in an automobile, which can be produced from a decreased number of parts and at a decreased number of assembling steps.

2 Claims, 4 Drawing Sheets

AIR CONDITIONING DUCT DEVICE IN AUTOMOBILE

BACKGROUND OF THE INVENTION

1. Field of the Invention

The present invention relates to an air conditioning duct device in an automobile, including an air conditioning duct disposed inside an instrument panel of the automobile.

2. Description of the Related Art

In such a conventional air conditioning duct device in an automobile, an air conditioning duct is formed by molding separately from an instrument panel and mounted to a vehicle body or the instrument panel. Namely, the instrument panel and the air conditioning duct are formed to function independently (see Japanese Patent Application Laid-open No.8-58431).

In an air conditioning duct device in which an instrument panel and an air conditioning duct function independently, as described above, the number of parts and the number of assembling steps are increased, and the reduction in cost is limited.

SUMMARY OF THE INVENTION

Accordingly, it is an object of the present invention to provide an inexpensive air conditioning duct device in an automobile, including an instrument panel that can also serve as a duct element, leading to a decreased number of parts and a decreased number of assembling steps.

To achieve the above object, according to a first aspect and feature of the present invention, there is provided an air conditioning duct device in an automobile, comprising an instrument panel of the automobile, which is formed by coating a skin made of a synthetic resin to a surface of a panel body made of a synthetic resin foam, and a duct element made of a synthetic resin foam having a compatibility with the panel body the duct element being welded to a back of the panel body, thereby defining air-conditioning air passage means between the panel body and the duct element.

With the first feature, the instrument panel also serves as a single duct element defining the air passage means, and a special mounting member for mounting the air conditioning duct to the instrument panel is not required, thereby bringing about reductions in number of parts and number of assembling steps of the air conditioning duct. Moreover, because the panel body and the duct element are made of the synthetic resin foams having the compatibility with each other, the welding of the panel body and the duct element to each other can simply and reliably be performed, and the air conditioning duct having an excellent heat-insulating property. Moreover, the instrument panel and the duct element increase their strengths by each other, whereby required strengths of the instrument panel and the air conditioning duct can easily be ensured.

According to a second aspect and feature of the present invention, there is provided an air conditioning duct device in an automobile, comprising an instrument panel of the automobile, which is formed by coating a skin made of a synthetic resin to a surface of a panel body made of a synthetic resin foam, an upper duct element of a synthetic resin foam having a compatibility with the panel body, the upper duct element being welded to a back of the panel body, thereby defining upper air-conditioning air pass age means between the panel body and the upper duct element, and a lower duct element made of a synthetic resin foam having a compatibility with the upper duct element, the lower duct element being welded to a lower surface of the upper duct element to define lower air conditioning air passage means between the upper duct element and the lower duct element.

With the second feature, the upper and lower 2-stage air conditioning air passage means can simply be formed, whereby conditioning air can be supplied in a large number of directions of a vehicle compartment. The instrument panel, the upper duct element and the lower duct element effectively reinforce one another, whereby required strengths of the instrument panel and the air conditioning ducts can further easily be ensured.

The above and other objects, features and advantages of the invention will be come apparent from the following description of the preferred embodiment taken in conjunction with the accompanying drawings.

DETAILED DESCRIPTION OF THE PREFERRED EMBODIMENTS

The present invent on will now be described by way of an embodiment with reference to the accompanying drawings.

Figure 1:
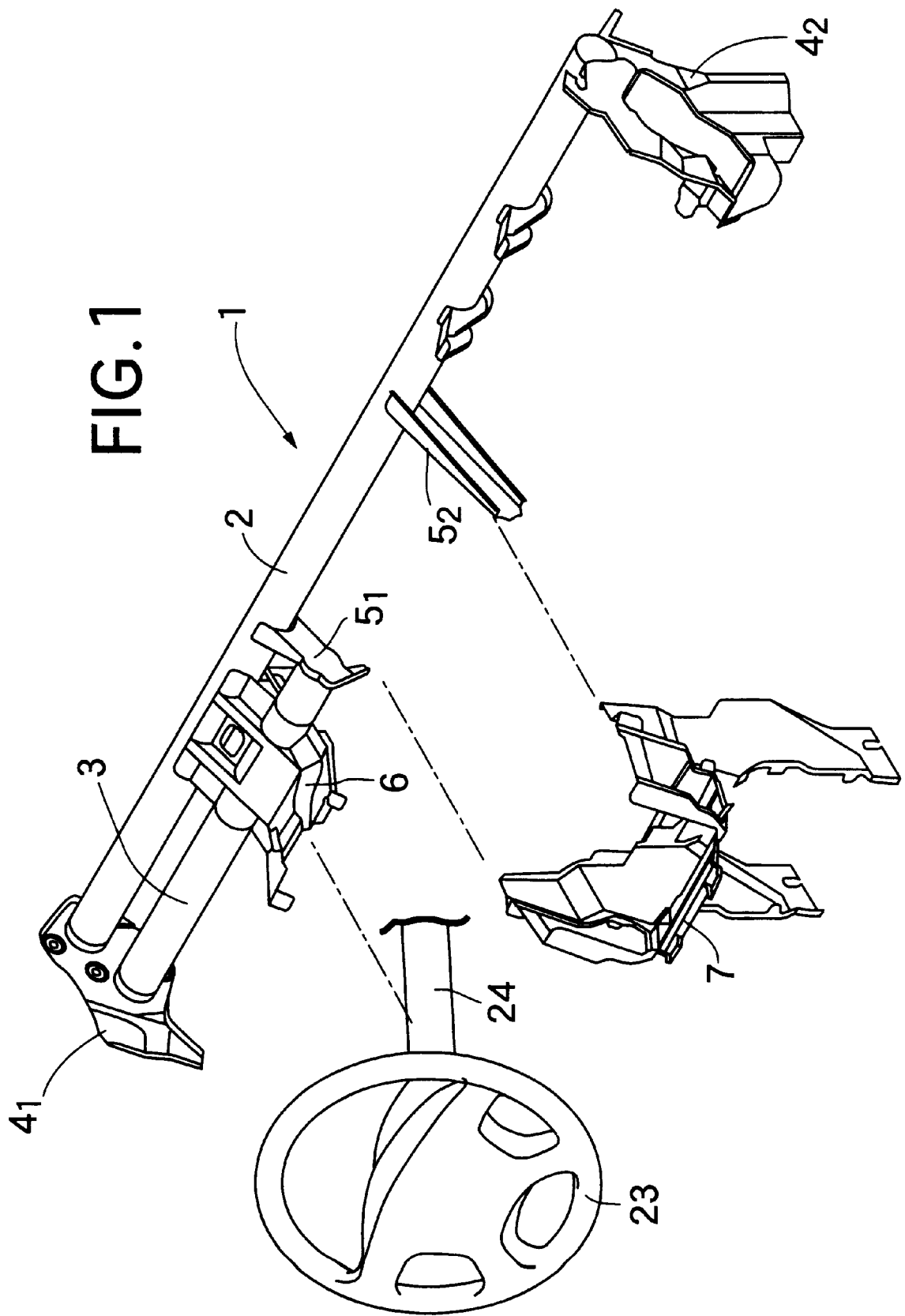
FIG. 1 is a perspective view of a steering hanger member of an automobile.

Referring first to FIG. 1, a steering hanger member 1 of an automobile comprises longer hanger beam 2 made of a steel pipe, a pair of left and right side brackets $4_1$ and $4_2$ welded to opposite ends of the longer hanger beam 2, a shorter hanger beam 3 welded to at its one end to the left side bracket $4_1$ and disposed in parallel to the longer hanger beam 2, a left intermediate stay $5_1$ which connects the other end of the shorter hanger beam 3 to an intermediate portion of the longer hanger beam 2, a right intermediate stay $5_2$ coupled to the longer hanger beam 2, so that it is opposed to the left intermediate stay $5_1$, and a column mounting bracket 6 which connects an intermediate portion of the shorter hanger beam 3 to the longer hanger beam 2. The left and right side brackets $4_1$ and $4_2$ are bolted to left and right front pillars (not shown) of a vehicle body, respectively. A steering column 24 for supporting a steering wheel 23 is mounted to the column mounting bracket 6, and a console box mounting bracket 7 is secured to the intermediate stays $5_1$ and $5_2$.

Figure 2:
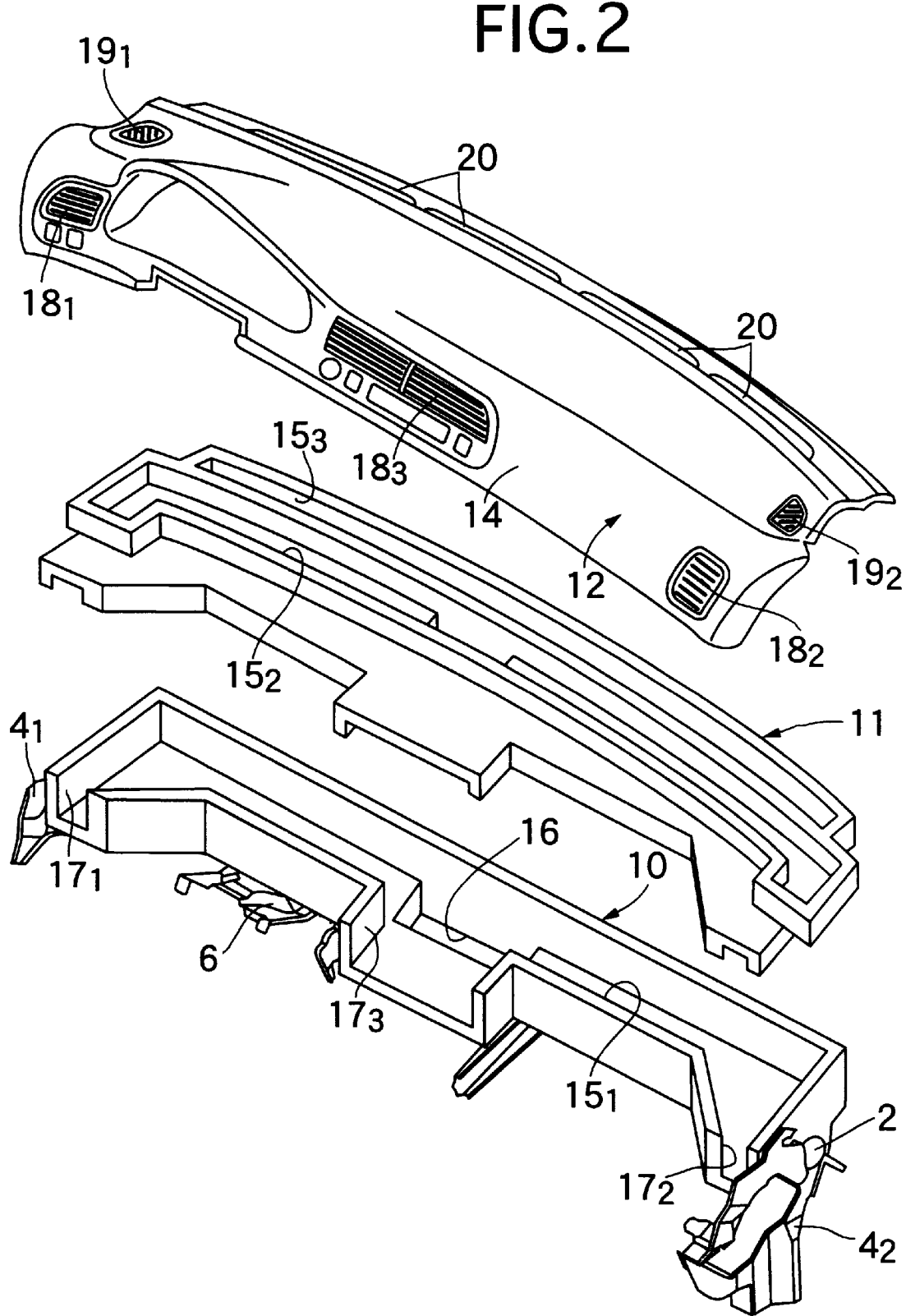
FIG. 2 is an exploded perspective view of an air conditioning duct and an instrument panel to which the steering hanger member is coupled.
Figure 3:
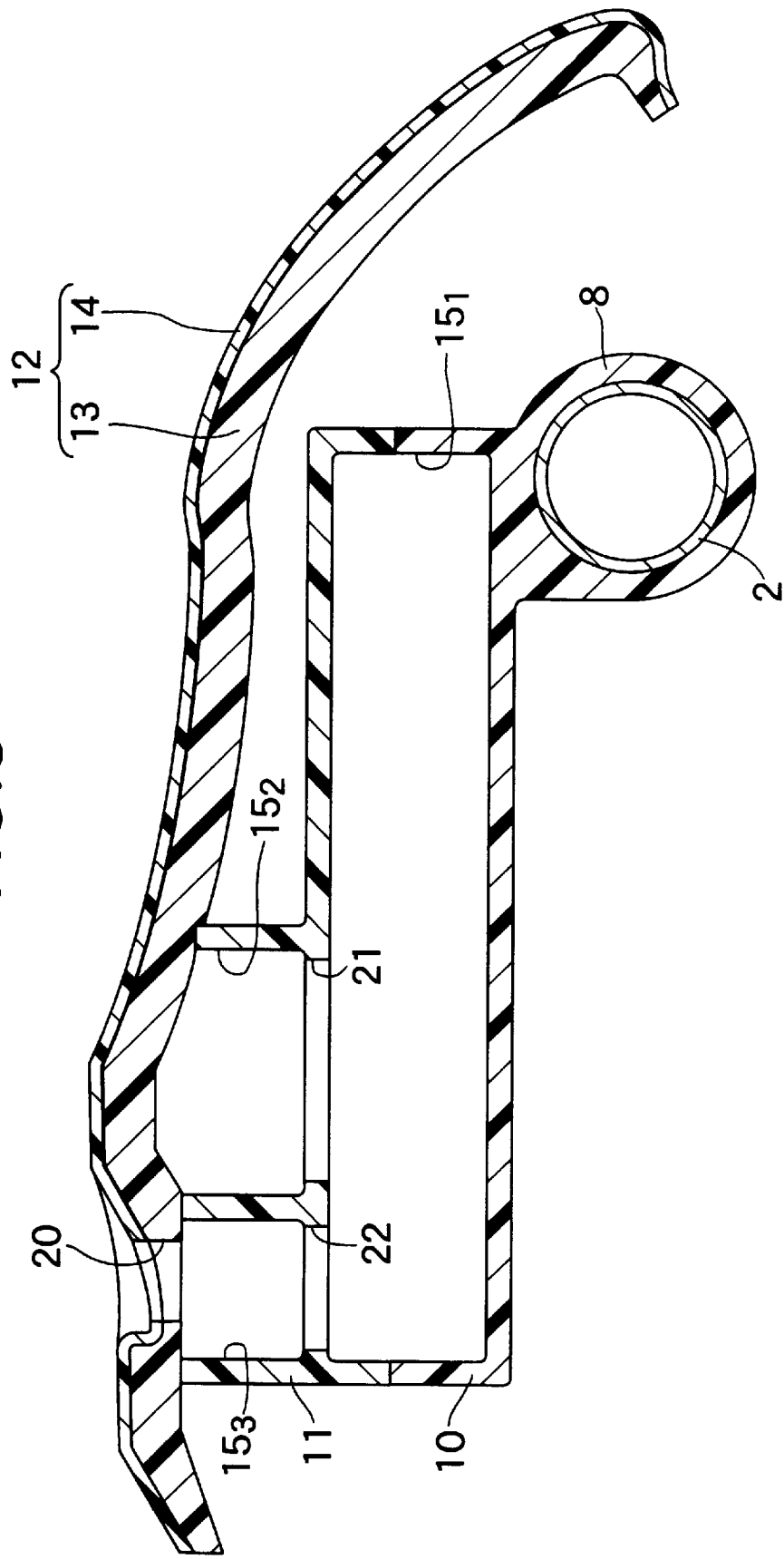
FIG. 3 is a cross sectional view of the air conditioning duct.

As shown in FIGS. 2 and 3, a synthetic resin foam 8 is applied to outer peripheral surfaces of the longer and shorter hanger beams 2 and 3 of the steering hanger member 1.

If the synthetic resin foam 8 is applied to the outer peripheral surfaces of the longer and shorter hanger beams 2 and 3 of the steering hanger member 1, as described above, when external force is applied to the longer and shorter hanger beams 2 and 3, the synthetic resin foam 8 also generates stress and resists the external force by cooperation with the longer and shorter hanger beams 2 and 3 to contribute to enhancement in rigidity of the longer and shorter hanger beams 2 and 3.

A test showed that when a polypropylene (PP) foam having an expansion ratio of 5 and a thickness of 5 mm was applied to a steel pipe having an outside diameter of 60 mm and a thickness of 1.6 mm, the rigidity could be increased by 10%, as compared with a steel pipe to which such a coating was not applied.

Particularly, the synthetic resin foam 8 can achieve a large thickness, as compared with a non-foamed synthetic resin of the same quality and the same weight. Therefore, when the synthetic resin foam 8 is applied to the outer peripheral surfaces of the longer and shorter hanger beams 2 and 3, a large outside diameter can be provided to the synthetic resin foam 8, thereby increasing the sectional factor of the synthetic resin foam 8 and effectively enhancing the rigidity of the longer and shorter hanger beams 2 and 3.

Moreover, the synthetic resin foam 8 has a far smaller specific gravity than that of the steel pipe and hence, an increase in weight due to the application of the synthetic resin foam 8 is less, as compared with a case where the outside diameter and the thickness of the steel pipe forming the longer and shorter hanger beams 2 and 3 are increased.

The synthetic resin foam 8 has a lower duct element 10 integrally provided at an upper portion thereof. Namely, the lower duct element 10 forms a portion of the synthetic resin foam 8. An upper duct element 11 is bonded to an upper surface of the lower duct element 10, and an instrument panel 12 is sequentially bonded to an upper surface of the upper duct element 11.

The upper duct element 11 is formed of a synthetic resin foam which is compatible with the lower duct element 10. The instrument panel 12 is comprised of a panel body 13 made of a synthetic resin foam which is compatible with the upper duct element 11, and a crimped skin 14 of a synthetic resin bonded to a surface of the panel body 13. All the synthetic resin foams are made of, for example, a material of olefinic polypropylene (PP). The lower duct element 10 and the upper duct element 11, as well as the upper duct element 11 and the panel body 13 of the instrument panel 12 are welded to each other by ultrasonic wave.

The lower and upper duct elements 10 and 11 define a first air passage $15_1$ extending laterally between the elements 10 and 11, and three outlets $17_1$, $17_2$ and $17_3$ protruding from the first air passage $15_1$ toward a vehicle compartment. An inlet 16 is defined in the lower duct element 10 and opens into a central portion of the first air passage $15_1$.

The upper duct element 11 and the panel body 13 define a second air passage $15_2$ and a third air passage $15_3$ which extend laterally between the upper duct element 11 and the panel body 13. Through-bores 21 and 22 are provided in the upper duct element 11 and communicate between the first air passage $15_1$ and the second air passage $15_2$, and between the first air passage $15_1$ and the third air passage $15_3$.

The instrument panel 12 is provided with three front blow-out bores $18_1$, $18_2$ and $18_3$ connected to the three outlets $17_1$, $17_2$ and $17_3$, a pair of left and right side blow-out bores $19_1$ and $19_2$ communicating with opposite ends of the second air passage $15_2$, and a plurality of upper blow-out bores 20 which open from the third air passage $15_3$ toward an inner surface of a front window shield (not shown).

Therefore, if an air feed duct of an air conditioner is connected to the inlet 16 and the air conditioner is operated, cold air or warm air can be allowed to flow from the inlet 16 into the first, second and third air passages $15_1$, $15_2$ and $15_3$ and can be blown from the blow-out bores $18_1$, $18_2$, $18_3$; $\cdot_1$, $19_2$ and 20.

The instrument panel 12 defines the second and third air passages $15_2$ and $15_3$ between surfaces opposed to the upper duct element 11 welded to the panel body 13 and hence, serves as one duct element forming a pair with the upper duct element 11. The instrument panel 12, the upper duct element 11 and the lower duct element 10 are welded to one another and hence, a special mounting member for mounting the duct elements 10 and 11 to the instrument panel 12 is not required. Moreover, the panel body 13 and the duct elements 10 and 11 are formed of a synthetic resin foams which are compatible with each other and hence, the welding can simply and reliably be performed. This brings about reductions in number of parts and number of assembling steps for an air conditioning duct, and an air conditioning duct having an excellent heat insulating property can be provided at a low cost.

Moreover, by a simple structure in which the instrument panel 12, the upper duct element 11 and the lower duct element 10 are welded to one another, the upper and lower 2-stage air passages $15_2$, $15_3$ and $15_1$ can be formed, thereby supplying conditioning air in a large number of directions in the vehicle compartment. Further, the instrument panel 12, the upper duct element 11 and the lower duct element 10 reinforce one another and hence, the required strength of the instrument panel 12 and the air conditioning duct can easily be ensured.

Figure 4:
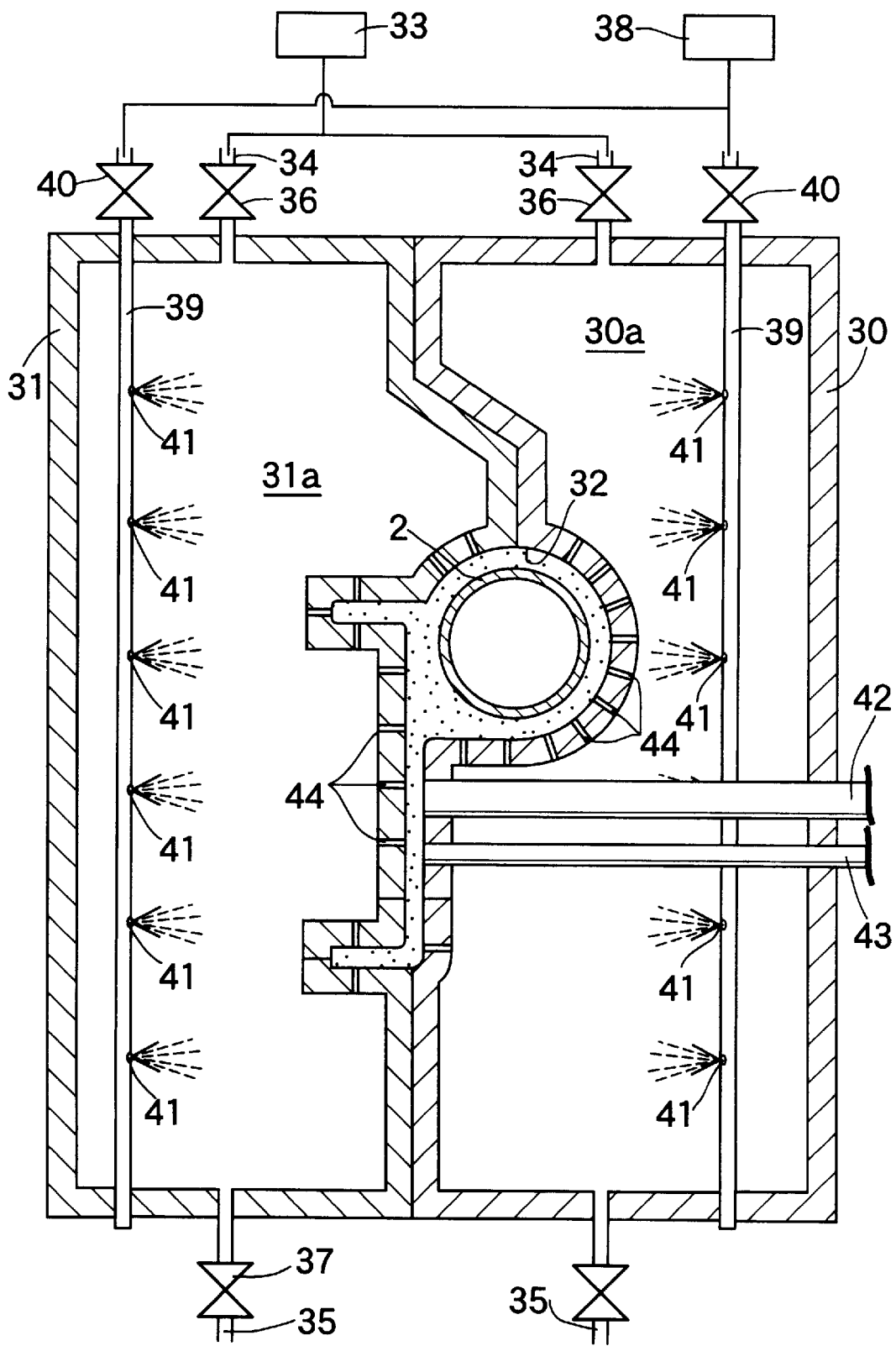
FIG. 4 is a sectional view of a molding apparatus for forming a lower duct element of the air conditioning duct by molding.

A process for forming the synthetic resin foam 8 and the lower duct element 10 will be described below with reference to FIG. 4.

For the purpose of forming them, a stationary die 30 and a movable die 31 which are capable of being open ed and closed relative to each other, are prepared. The dies 30 and 31, when being closed, define a cavity 32 therebetween, which is put into the forming of the synthetic resin foam 8 and the lower duct element 10. Each of the dies 30 and 31 is hollow, and a large number of fine bores 44 are provided in the dies 30 and 31 for communicating between hollow insides 30a and 31a of the dies 30 and 31 and the cavity 32.

A vapor introducing pipe 34 connected to a vapor generating device 33 and a discharge pipe 35 are connected to the hollow insides 30a and 31a. An inlet valve 36 and an outlet valve 37 are provided in the vapor introducing pipe 34 and the discharge pipe 35, respectively. A cooling water pipe 39 is disposed in each of the hollow inside 30a and 31a and connected to a cooling water supply device 38. The cooling water pipe 39 includes an on-off valve 40 provided at its upstream portion, and a large number of nozzles 41 which are provided within the hollow insides 30a and 31a and which open toward the cavity 32.

The stationary die 30 is provided with an injector 42 for supplying previously foamed beads into the cavity 32, and a push-out pin 43 for releasing a molded product from the stationary die.

To carry out the molding, the longer and shorter hanger beams 2 and 3 (not shown in FIG. 4), which are passed through a predetermined area of the cavity 32, while closing the dies 30 and 31, are first clamped between the dies 30 and 31, and previously foamed beads of a synthetic resin are supplied from the injector 42 into the cavity 32. Then, the inlet valve 36 in the vapor introducing pipe 34 is opened to supply water vapor of a high temperature into the hollow insides 30a and 31a in the dies 30 and 31, thereby injecting the water vapor through the large number of fine bores 44 into the cavity 32. This causes the previously foamed beads within the cavity 32 to be heated and expanded to fill the cavity 32. Thus, the synthetic resin foam 8 and the lower duct element 10 are formed, and at the same time, the synthetic resin foam 8 is applied to the outer peripheral surfaces of the longer and shorter hanger beams 2 and 3.

After the lapse of a predetermined expanding time, the inlet valve 36 is closed, and the outlet valve 37 in the discharge pipe 35 and the on-off valve 40 in the cooling water pipe 39 are opened to inject cooling water from the large number of nozzles 41 in the cooling water pipe 39 toward the cavity 32, thereby cooling the dies 30 and 31 around the cavity 32 and a molded product. After the cooling, the opening of the dies is carried out, and the push-out pin 43 is operated, thereby removing the molded product.

The present invention is not limited to the above-described embodiments, and various modifications may be made in a scope without departing from the subject matter of the present invention. For example, the lower duct element 10 and the upper duct element 11 can integrally be formed. However, the upper and lower 2-stage air conditioning air passages $15_2$, $15_3$ and $15_1$ can more easily be formed rather by welding the lower duct element 10 and the upper duct element 11 to each other, which have been formed separately, as described in the embodiment.

What is claimed is:

1. An air conditioning duct device in an automobile, comprising:

an instrument panel of the automobile formed by coating a synthetic resin skin on an outer surface of a panel body of the instrument panel, the panel body being made of a synthetic resin foam; and a duct element made of a synthetic resin foam having a compatibility with said panel body, said duct element being welded to a back of said panel body, thereby defining at least one air-conditioning air passage between said panel body and said duct element, wherein the compatibility of the synthetic resin foam of the panel body and the duct element, respectively, provides the at least one air-conditioning air passage with a desired heat-insulating property.

2. An air conditioning duct device in an automobile, comprising:

an instrument panel of the automobile formed by coating a synthetic resin skin on an outer surface of a panel body of the instrument panel, the panel body being made of a synthetic resin foam;

an upper duct element made of a synthetic resin foam having a compatibility with said panel body, said upper duct element being welded to a back of said panel body, thereby defining an upper air-conditioning air passage between said panel body and said upper duct element; and a lower duct element made of a synthetic resin foam having a compatibility with said upper duct element, said lower duct element being welded to a lower surface of said upper duct element to define a lower air-conditioning air passage between said upper duct element and said lower duct element, wherein the compatibility of the synthetic resin foam of the panel body and the upper duct element, respectively, provides the at least one air-conditioning air passage with a desired heat-insulating property.

* * * * *